United States Patent
Oh et al.

(10) Patent No.: US 8,148,871 B2
(45) Date of Patent: Apr. 3, 2012

(54) STRUCTURE OF CASING OF SMALL STEPPING MOTOR

(75) Inventors: Dong Hwan Oh, Bu Cheon (KR); Heung Jai Won, Seoul (KR)

(73) Assignee: Moatech Co., Ltd (KR)

( * ) Notice: Subject to any disclaimer, the term of this patent is extended or adjusted under 35 U.S.C. 154(b) by 3 days.

(21) Appl. No.: 12/683,583

(22) Filed: Jan. 7, 2010

(65) Prior Publication Data

US 2010/0181865 A1 Jul. 22, 2010

(30) Foreign Application Priority Data

Jan. 20, 2009 (KR) .................. 10-2009-0004390

(51) Int. Cl.
*H02K 1/12* (2006.01)
(52) U.S. Cl. ....................................... 310/257
(58) Field of Classification Search .................. 310/257, 310/49.11, 49.16, 49.17, 49.34
See application file for complete search history.

(56) References Cited

U.S. PATENT DOCUMENTS

| 548,402 | A | * | 10/1895 | Storey | 310/257 |
| 557,714 | A | * | 4/1896 | Storey | 310/257 |
| 583,264 | A | * | 5/1897 | Lundell | 310/257 |
| 587,531 | A | * | 8/1897 | Lundell | 310/257 |
| 2,405,012 | A | * | 7/1946 | Bousky | 310/211 |
| 3,383,534 | A | * | 5/1968 | Ebbs | 310/257 |
| 3,633,055 | A | * | 1/1972 | Maier | 310/156.26 |
| 5,811,898 | A | * | 9/1998 | Everingham | 310/36 |

* cited by examiner

*Primary Examiner* — Dang Le
(74) *Attorney, Agent, or Firm* — John K. Park; Park Law Firm

(57) ABSTRACT

Disclosed is a structure of a casing of a small stepping motor having an outer diameter of 8 mm or less, in which yoke teeth are integrally formed on the inner surface of the casing, and the thickness of the outer wall of the casing is different from the thickness of each of the yoke teeth. The casing of a small stepping motor includes yoke teeth integrally formed on an inner surface of the casing, in which a thickness of an outer wall of the casing is different from a thickness of the yoke tooth.

3 Claims, 2 Drawing Sheets

[FIG. 1]
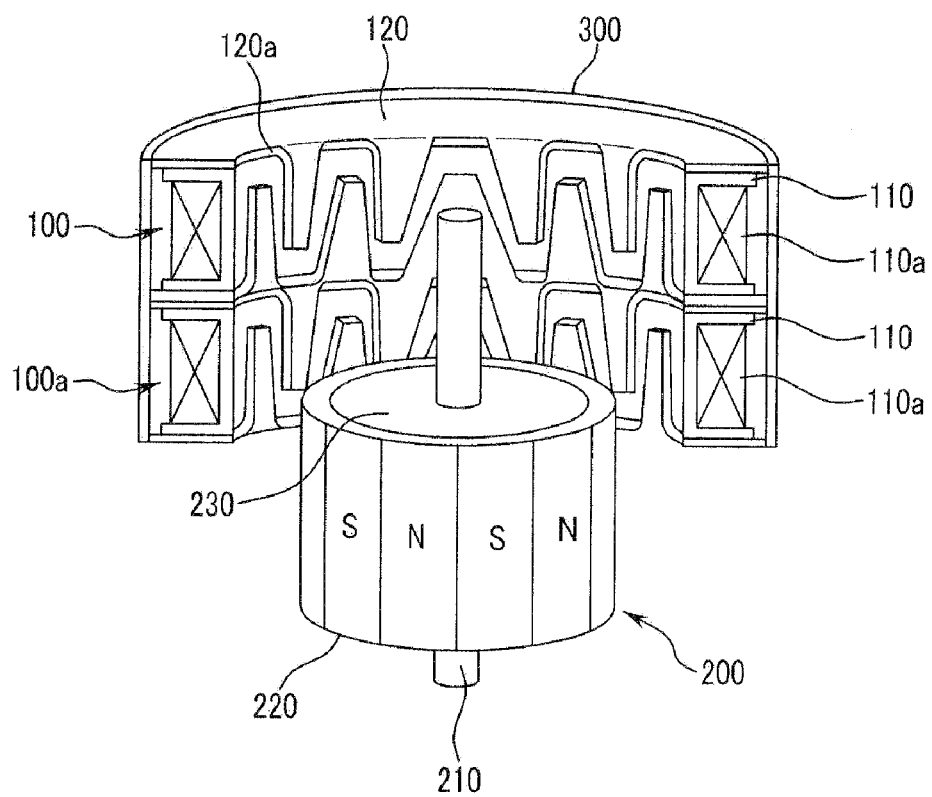
[FIG. 2]
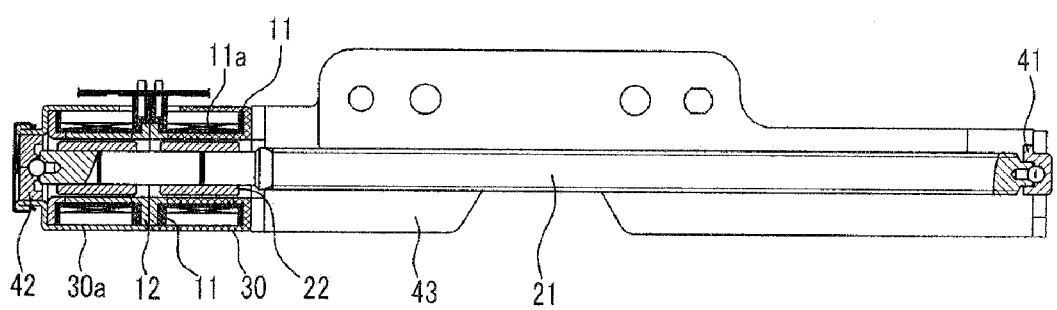

[FIG. 3]
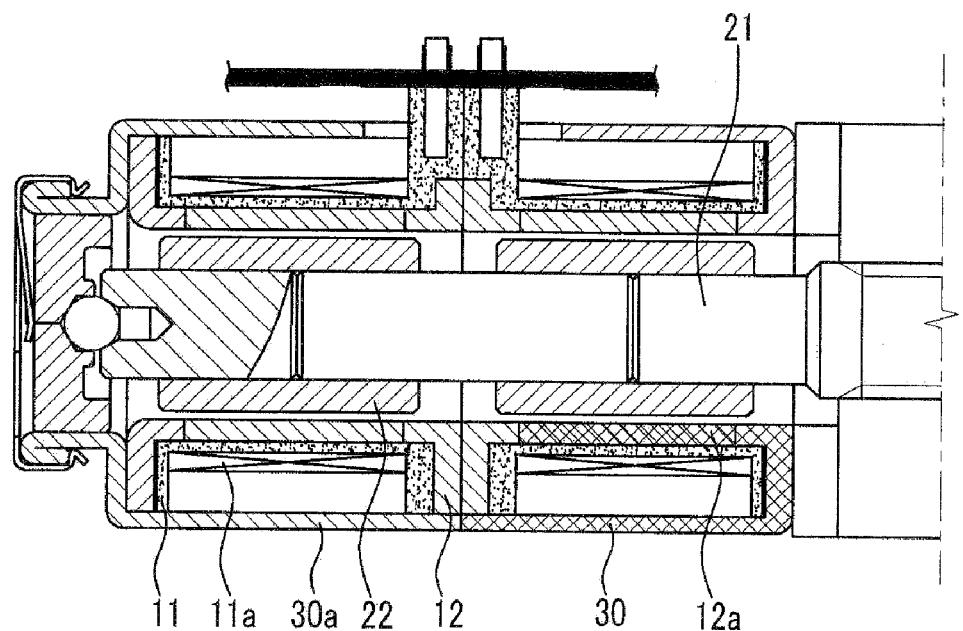
[FIG. 4]
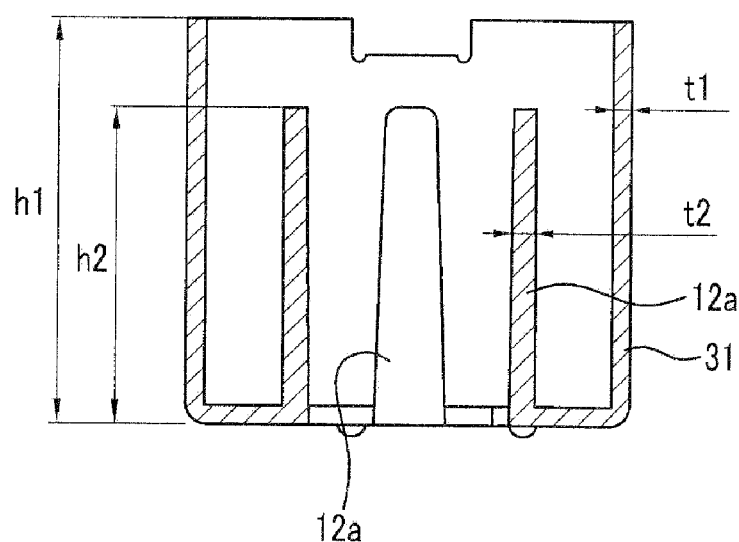

STRUCTURE OF CASING OF SMALL STEPPING MOTOR

BACKGROUND OF THE INVENTION

1. Technical Field

The present invention relates to a structure of a casing of a small stepping motor, and, more particularly, to a structure of a casing of a small stepping motor having an outer diameter of 8 mm or less, in which a plurality of yoke teeth is integrally formed on the inner surface of the casing, and the thickness of the outer wall of the casing is different from the thickness of each of the yoke teeth, thus reducing a production cost and improving a process.

2. Description of the Related Art

Generally, an optical pickup apparatus, such as office automation (OA) appliances, optical disk drives (ODDs), hard disk drives (HDDs) or the like, is an apparatus for irradiating data recorded in an optical disk with a laser beam using an optical pickup actuator to decipher the data and then transmitting the deciphered data to a display device. Such an optical pickup apparatus is provided with a stepping motor, and the stepping motor is used to pickup the optical pickup apparatus while transporting it from a base by a predetermined distance.

The stepping motor includes a rotor equipped with a magnet and a stator spaced apart from the rotor by a predetermined distance, and is configured such that the rotor is rotated by external control signals applied to the stator.

As shown in FIG. 1, a general stepping motor includes a rotor 200, a pair of stators 100 and 100a spaced apart from the rotor 200, and a casing 300 covering the pair of stators 100 and 100a to protect them.

Here, the rotor 200 includes a shaft 210, a magnet 220 provided on the outer surface of the shaft 210, and a spacer 230 disposed between the shaft 210 and the magnet 220 such that the shaft 210 is positioned at the center of the rotor 200, and is disposed in the space defined by the inner surface of the pair of stators 100 and 100a.

The pair of stators 100 and 100a include a first stator 100 and a second stator 100a. Each of the first stator 100 and the second stator 100a includes a bobbin 110 wound with a coil 110a and yokes 120 provided with a plurality of yoke teeth 120a supporting the inner surface of the bobbin 110.

Each of the first stator 100 and the second stator 100a include two yokes 120 opposed to each other, and the yoke teeth 120a of the two yokes 120 are alternately disposed.

The magnetic flux of the magnet 220 passes through the yoke teeth 120a of the first stator 100 alternately disposed, and the yoke teeth 120 of the second stator 100a alternately disposed. The stepping motor is configured such that it is rotated by external control signals applied to the stators 100 and 100a. In this case, the thickness of the yoke teeth 120a is closely related to the magnetic flux density of the magnet 220.

However, the conventional stepping motor is problematic in that it has four yokes 120, each being provided with a plurality of yoke teeth 120a, so that a large number of parts are required, thereby increasing the production costs thereof.

In order to solve the above problem, a stepping motor which can reduce the number of yokes by integrally forming yoke teeth on the inner surface of a casing has been developed. However, only the idea that the number of yokes can be reduced by integrally forming yoke teeth on the inner surface of the casing is considered, so that the thickness of the outer wall of the casing becomes equal to that of the yoke teeth, with the result that it is difficult to decrease the outer diameter of a stepping motor having an outer diameter of 8 mm or less.

Therefore, there is a problem in that, when the thickness of the outer wall of the casing is decreased in order to decrease the thickness of this stepping motor, the thickness of the yoke teeth is also decreased, so that the stepping motor cannot exhibit normal torque characteristics.

SUMMARY OF THE INVENTION

Accordingly, the present invention has been made to solve the above-mentioned problem, and an object of the present invention is to provide a structure of a casing of a small stepping motor, in which a plurality of yoke teeth is integrally formed on the inner surface of the casing, and the thickness of the outer wall of the casing is different from the thickness of each of the yoke teeth, so that the stepping M motor can exhibit higher torque performance and the number of components constituting the stepping motor is decreased, with the result that the production cost thereof can be reduced and a process of assembling the stepping motor can also be simplified, thereby reducing the incidence of defectiveness generated in the process of assembling the stepping motor.

In order to accomplish the above object, an aspect of the present invention provides a casing of a small stepping motor, including: a plurality of yoke teeth integrally formed on an inner surface of the casing, wherein a thickness ($t1$) of an outer wall of the casing is different from a thickness ($t2$) of the yoke tooth.

In the casing, the small stepping motor may have an outer diameter of 8 mm or less.

Further, the casing may have any one shape selected from among a circle, rectangle, ellipse, and circle or ellipse whose both sizes are rectilinear.

Further, the thickness ($t1$) of an outer wall of the casing may be smaller than the thickness ($t2$) of the yoke tooth.

Furthermore, in the casing of the small stepping motor having an outer diameter of 8 mm or less, a plurality of yoke teeth may be integrally formed on the inner surface of the casing. However, when the height ($h1$) of the outer wall 31 of the casing is 6.0 mm or more and the height ($h2$) of the yoke tooth is 4.0 mm or more, the ratio ($h1/h2$) of the height ($h1$) of the outer wall 31 of the casing to the height ($h2$) of the yoke tooth may be in a range of 1.0 to 1.5.

BRIEF DESCRIPTION OF THE DRAWINGS

The above and other objects, features and advantages of the present invention will be more clearly understood from the following detailed description taken in conjunction with the accompanying drawings, in which:

FIG. 1 is a perspective view showing a structure of a general stepping motor;

FIG. 2 is a sectional view showing a stepping motor according to an embodiment of the present invention;

FIG. 3 is an expanded sectional view showing a motor unit of the stepping motor according to an embodiment of the present invention; and FIG. 4 is a sectional view showing a casing of the stepping motor according to an embodiment of the present invention.

DESCRIPTION OF THE PREFERRED EMBODIMENTS

Hereinafter, preferred embodiments of the present invention will be described in detail with reference to the attached drawings.

FIG. 2 is a sectional view showing a stepping motor according to an embodiment of the present invention, FIG. 3 is an expanded sectional view showing a motor unit of the stepping motor according to an embodiment of the present invention, and FIG. 4 is a sectional view showing a casing of the stepping motor according to an embodiment of the present invention.

As shown in FIG. 2, the stepping motor according to the present invention, which is a small stepping motor, particularly, a small stepping motor having an outer diameter of 8 mm or less, includes: a motor unit including a stator composed of a bobbin 11 wound with a coil 11a and a yoke 12 provided with a plurality of yoke teeth 12a disposed in the inner surface of the bobbin 11, a rotor composed of a shaft 21 disposed in the inner surface of the stator and a magnet 22 provided on the outer surface of the shaft 21; and a bracket supporting the shaft 21 extended from the motor unit. Here, the shaft 21 is configured such that one end thereof is rotatably supported by a pivot bearing 41 and the other end thereof is supported by a center guide 42 such that its rotating center is stably supported.

The motor unit is described in detail with reference to FIG. 3 as follows.

The motor unit includes two casings 30 and 30a. Here, the casing 30 is integrally formed on the inner surface thereof with a plurality of yoke teeth 12a, and the bobbin 11 wound with the coil 11a is provided on the outer surface of the yoke teeth 12a.

The plurality of yoke teeth 12a integrally formed on the inner surface of the casing 30 are alternately disposed with the plurality of yoke teeth 12a formed on the yoke 12.

It is shown in FIG. 3 that the casing 30a is not integrally formed on the inner surface thereof with a plurality of yoke teeth 12a. However, the casing 30a, like the casing 30, may also be integrally formed on the inner surface thereof with a plurality of yoke teeth 12a.

In the conventional stepping motor, a plurality of yoke teeth are not integrally formed on a casing, but are formed on an additional yoke. However, in the stepping motor of the present invention, the plurality of yoke teeth 12a are integrally formed on the inner surface of the casing, and thus there is an advantage in that the number of parts can be reduced.

In the small stepping motor, particularly, a small stepping motor having an outer diameter of 8 mm or less according to the present invention, since the entire length of the stepping motor is larger than the outer diameter thereof, the casing 30 is required to be designed such that it is deep-drawn in the length direction thereof, and, in order to realize higher torque characteristics, the casing 30 is required to make the yoke teeth 12a thick.

As shown in FIG. 4, the structure of the casing of the small stepping motor according to the present invention is configured such that the thickness (t1) of the outer wall 31 of the casing is different from the thickness (t2) of the yoke tooth 12a.

Thus, even when the thickness (t2) of the yoke tooth 12a must be increased in order to improve the torque characteristics of the stepping motor, it is possible to design the stepping motor without increasing the thickness (t1) of the outer wall 31 of the casing, so that the torque characteristics of the stepping motor can be improved without influencing the outer diameter of the stepping motor.

It is preferred that the ratio (t2/t1) of the thickness (t2) of the yoke tooth 12a to the thickness (t1) of the outer wall 31 of the casing be more than 1.2.

According to circumstances, the thickness (t1) of the outer wall 31 of the casing may be greater than the thickness (t2) of the yoke tooth 12a. In this case, it is preferred that the ratio (t2/t1) of the thickness (t2) of the yoke tooth 12a to the thickness (t1) of the outer wall 31 of the casing be less than 0.8.

Further, the section of the casing 30 may have any one shape selected from among a circle, rectangle, ellipse, and circle or ellipse whose both sides are rectilinear.

Meanwhile, according to another embodiment of the present invention, in order to exhibit the effective torque characteristics of the small stepping motor, the height of the yoke tooth 12a is limited in accordance with the height of the outer wall 31 of the casing.

In a casing of a small stepping motor having an outer diameter of 8 mm or less, as described in the above embodiment, a plurality of yoke teeth are integrally formed on the inner surface of the casing. However, when the height (h1) of the outer wall 31 of the casing is 6.0 mm or more and the height (h2) of the yoke tooth is 4.0 mm or more, the ratio (h1/h2) of the height (h1) of the outer wall 31 of the casing to the height (h2) of the yoke tooth must be in a range of 1.0 to 1.5.

Further, as described above, in the casing 30 of the small stepping motor, the height of the yoke tooth 12a is limited in accordance with the height of the outer wall 31 of the casing 30, but, as described in the above embodiment, the thickness of the yoke tooth 12a may be different from the height of the outer wall 31 of the casing 30.

As described above, the structure of a casing of a small stepping motor according to the present invention is advantageous in that a plurality of yoke teeth is integrally formed on the inner surface of the casing, and the thickness of the outer wall of the casing is different from the thickness of each of the yoke teeth, so that the stepping motor can exhibit higher torque performance and the number of components constituting the stepping motor is decreased, with the result that the production cost thereof can be reduced and a process of assembling the stepping motor can also be simplified, thereby reducing the incidence of defectiveness generated in the process of assembling the stepping motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A casing of a small stepping motor, comprising: a plurality of yoke teeth integrally formed on an inner surface of the casing, wherein a thickness of an outer wall of the casing is smaller than a thickness of the yoke tooth, and wherein the ratio (h1/h2) of the height (h1) of the outer wall of the casing to the height (h2) of the yoke tooth is in a range of 1.01 to 1.5.

2. The casing of a small stepping motor according to claim 1, wherein the small stepping motor has an outer diameter of 8 mm or less.

3. The casing of a small stepping motor according to claim 1, wherein the casing has any one shape selected from among a circle, rectangle, ellipse, and circle or ellipse whose both sides are rectilinear.

* * * * *